United States Patent Office 3,373,039
Patented Mar. 12, 1968

3,373,039
ESTROGENIC COMPOUNDS AND ANIMAL
GROWTH PROMOTERS
Edward B. Hodge, Phil H. Hidy, and Herbert L. Wehrmeister, Terre Haute, Ind., assignors to Commercial Solvents Corporation, a corporation of Maryland
No Drawing. Continuation-in-part of application Ser. No. 640,503, May 23, 1967. This application Oct. 26, 1967, Ser. No. 678,177
10 Claims. (Cl. 99—2)

ABSTRACT OF THE DISCLOSURE

Compounds of the formula

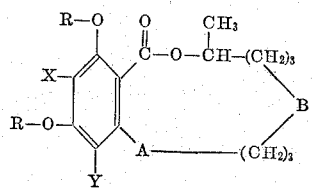

wherein A is —CH=CH— or —CH$_2$CH$_2$—; B is >C=O, >CHOR, or >CH$_2$; R is hydrogen, alkyl, acyl or aryl; and X or Y is hydrogen, nitro, amino, dialkylamino, diazonium, cyano, hydroxyl, aryl, alkenyl, alkyl, alkoxy or acyl; and animal feeds containing growth promoting amounts of these compounds.

The present invention relates to new compounds and an object of the present invention is to provide compounds which exhibit estrogenic activity or aid in increasing the rate of growth in meat-producing animals, e.g., cattle, lamb and swine.

This application is a continuation-in-part of applications Ser. No. 561,369, filed June 29, 1966, now abandoned, and Ser. No. 640,503, filed May 23, 1967, now abandoned.

The compounds of this invention are illustrated by the formula:

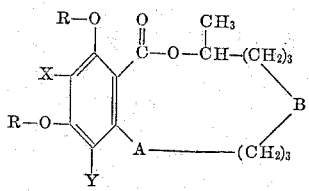

where A is —CH$_2$—CH$_2$— or —CH=CH—; B is >C=O, >CHOH, >CHOR or >CH$_2$; R is any chemically suitable substituent including (1) hydrogen; (2) substituted or unsubstituted alkyl, e.g., containing from about 1 to 15 carbon atoms including lower alkyl such as methyl, ethyl, hexyl, etc.; (3) acyl radicals generally containing from about 1 to 25 or more carbon atoms including acyclic radicals among which can be straight-chain alkanoyl radicals, e.g. stearoyl and behenoyl, branched-chain alkanoyl radicals, e.g. isobutyroyl, neodecanoyl and 2-ethylhexoyl, unsaturated aliphatic radicals, e.g. oleyl, linoleoyl, and crotonoyl, hydroxy-containing radicals, e.g. lactoyl, 12-hydroxystearoyl, ricinoleoyl and gluconoyl, keto-containing radicals, e.g. levulinoyl, carboxy-containing radicals, e.g. azelaoyl, maleoyl, fumaroyl, succinoyl, adipoyl, dodecenylsuccinoyl and malonoyl, polyfunctional aliphatic radicals, e.g. thiodiglycoloyl, tartaroyl, maloyl, dithiodiglycoloyl and mucoyl, and lower acyl, e.g. valeryl, propionyl and acetyl; or (4) substituted or unsubstituted aryl, for instance monocyclic aryl containing up to about 10 carbon atoms or more including aralkyl, e.g., benzyl or bromobenzyl; and X and Y are chemically suitable radicals such as (a) hydrogen; (b) nitro; (c) amino; (d) diazonium salt, —N$_2$+Z—, e.g., of a mineral acid where Z is a chloride or sulfate ion; (e) cyano; (f) hydroxyl; (g) substituted or unsubstituted aryl, particularly monocyclic aryl containing up to about 10 carbon atoms or more including phenyl and substituted phenyls including as substituents halo, e.g., bromo or chloro, alkyl, e.g., lower alkyl, alkoxy, e.g., methoxy or carboxy radicals; (h) substituted or unsubstituted alkenyl, generally containing from about 2 to 25 or more carbon atoms especially —CH=CHR$^3$, —CHR$^4$CH=CH$_2$, and —CH$_2$CH=CHR$^4$ where both R$^3$ and R$^4$ can be alkyl of about 1 to 15 carbon atoms, e.g., lower alkyl and R$^3$ can be substituted or unsubstituted aryl, e.g., monocyclic aryl containing up to about 10 or more carbon atoms, such as phenyl; carboxy or carboxyalkyl, e.g., —R$^5$COOH where R$^5$ is alkyl such as R$^3$ and R$^4$; (i) alkyl (R$^6$); (j) alkoxy (—OR$^6$), where R$^6$ is alkyl such as R$^3$; (k) acyl radicals generally containing from about 1 to 25 or more carbon atoms including acyclic radicals among which can be straight-chain alkanoyl radicals e.g. stearoyl and behenoyl, branched-chain alkanoyl radicals e.g. isobutyroyl, neodecanoyl and 2-ethylhexoyl, unsaturated aliphatic radicals e.g. oleyl, linoleoyl, and crotonoyl, hydroxy-containing radicals e.g. lactoyl, 12-hydroxystearoyl, ricinoleoyl and gluconoyl, keto-containing radicals e.g. levulinoyl, carboxy-containing radicals e.g. azelaoyl, maleoyl, fumaroyl, succinoyl, adipoyl, dodecenylsuccinoyl and malonoyl, polyfunctional aliphatic radicals e.g. thiodiglycoloyl, tartaroyl, maloyl, dithiodiglycoloyl and mucoyl, and lower acyl e.g. valeryl, propionyl and acetyl; or (1) di-lower alkyl amino e.g. dimethylamino; with the provisos that not more than one of X and Y is hydrogen and that when B is >CH$_2$, A is —CH$_2$CH$_2$—.

The compounds can be administered to animals by any suitable method including oral and parenteral administrations. For example, the compounds can be blended with ordinary feed containing nutritional values in an amount sufficient to produce the desired rate of growth and can thus be fed directly to the animals, or the compound can be suspended in a suitable injection suspension medium such as peanut oil and injected parenterally. The amount of compound fed to an animal, of course, varies depending upon the animal, desired rate of growth and the like.

When the new compounds are to be administered in feeds, an animal feed composition may be prepared containing the usual nitritionally-balanced quantities of carbohydrates, proteins, vitamins and minerals, together with the compound of the present invention. Some of these usual dietary elements are grains, such as ground grain and grain by-products; animal protein substances, such as those found in fish meal and meat scraps, vegetable proteins like soybean oil meal or peanut oil meal; vitaminaceous materials, e.g., vitmain A and D mixtures, riboflavin supplements and other vitamin B complex members; and bone meal and limestone to provide minerals. A type of conventional feed material for use with cattle includes alfalfa hay and ground corn cobs together with supplementary vitaminaceous substances if desired.

The compounds of the present invention can be produced from the compound:

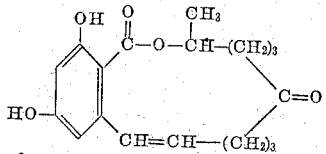

hereinafter referred to as the fermentation estrogenic substance (F.E.S.) by low temperature, e.g., 0 to 5° C., nitration of F.E.S. or from the appropriate derivatives of F.E.S., such as the dialkyl ether, e.g., the dimethyl-ether of F.E.S., and the F.E.S. sulfonates. Concentrated nitric acid can be used alone as the nitrating agent. The F.E.S. or F.E.S. derivative is added to the nitric acid alone or dissolved in, for example, acetic acid. The dialkyl ether of F.E.S. can be nitrated with mixed acid, a commercially available mixture of nitric and sulfuric acids, or a suitable mixture of these acids containing about equal amounts thereof or an excess of sulfuric acid. F.E.S. sulfonates can be nitrated with $HNO_3$ or nitrous gases, again after protecting the hydroxyl groups with alkyl groups. F.E.S. sulfonates are described in U.S. patent application Ser. No. 561,373, filed June 29, 1966, now abandoned.

As mentioned, the hydroxyl groups of F.E.S. can be protected against undesirable side reactions before nitration by converting the hydroxyl groups to ethers, e.g., methyl ethers, as taught in U.S. Patent 3,239,342 and subsequently removing the masking group to regenerate the hydroxyl group. The hydroxyl group can be regenerated from, for example, a methyl ether by hydrolysis or by refluxing in acetic acid solution with hydrobromic acid. Aluminum chloride is another effective dealkylating agent.

Benzyl groups are also suitable masking agents and can be removed by catalytic reduction. Benzyl ethers of F.E.S. are described in copending application Ser. No. 532,113, filed Mar. 7, 1966, now abandoned, and application Ser. No. 620,259, filed Mar. 3, 1967, which is a continuation-in-part thereof. U.S. Patents 3,239,354 and 3,239,347 desecribe F.E.S. compounds where A is

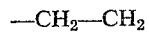

and R is acyl. Compounds where R is acyl, can be prepared by first sulfonating an alkyl ether of F.E.S., hydrolyzing the ether and subsequently acylating the compound. Tetrahydro F.E.S. compounds where A is

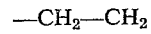

and B is >CHOH and deoxy F.E.S. compounds where A is —$CH_2$—$CH_2$ and B is >$CH_2$ are described, respectively, in U.S. Patent 3,239,345 and U.S. Patent 3,239,341.

The amine substituted F.E.S. compounds are produced by reduction of the corresponding nitro-substituted F.E.S. compound with, for example, iron or zinc in an alcoholic, e.g., methanol, ethanol, etc., solution of HCl at about room temperature, or higher. Diazonium mineral acid salts of F.E.S., e.g., F.E.S. diazonium chloride or sulfate, are produced from the corresponding amine by reaction at low temperatures, e.g., 0 to 5° C., with the mineral acid and an aqueous solution of sodium nitrite. F.E.S. nitriles result from the action of a solution, e.g., acidic of cuprous cyanide in excess potassium cyanide on a F.E.S. diazonium salt.

The diazonium salts also provide intermediates for the placement of aryl and hydroxyl substituents on the smaller A ring of F.E.S. Heating of ana queous solution of a F.E.S. diazonium salt with sulfuric acid evolves nitrogen and the amine substituent is concerted to a hydroxyl. The coupling of an aryl compound, e.g., monocyclic aryls such as benzene, benzoic acid, benzoic acid esters, etc., including substituted aryl compounds such as halo-substituted benzenes, to the benzene ring of F.E.S. is accomplished by adding a large excess of liquid aryl component to a diazonium salt of F.E.S. at low temperature, e.g., 0° C., and then slowly adding a sodium hydroxide solution dropwise into the vigorously stirred system.

The hydroxyl substituted F.E.S. compounds provide intermediates for the production of O-alkyl and O-acyl-substituted F.E.S. compounds. For example, O-alkyl substituted F.E.S. compounds can be produced by alkylation of the hydroxyl groups as taught in U.S. Patent 3,239,342. An acyl F.E.S. derivative can be produced as taught in U.S. Patent 2,239,347 by reaction with the corresponding anhydride.

C-alkyl groups to be contrasted with the O-alkyl groups, can be placed on F.E.S. by Friedel-Crafts alkylation procedures using halo-substituted alkyls and an acid catalyst such as the anhydrouos inorganic halides $AlCl_3$, $FeCl_3$, $SnCl_4$, etc.

Alkenyl substituted F.E.S. compounds are produced by reaction of F.E.S. with an alkenyl halide of about 1 to 18 carbon atoms such as $R^4CH$=$CHCH_2A$ where $R^4$ is alkyl of about 1 to 15 carbon atoms, particularly lower alkyl and A is a halogen, e.g., bromine or chlorine, at a hydroxyl group and subsequent rearrangement of the product. By selecting reaction conditions, the alkenyl can be, for example, either $CHR^4CH$=$CH_2$ or $CH_2CH$=$CHR$ where $R^4$ has the above described meaning. The F.E.S. diazonium salts also react with a non-aromatic unsaturated compound, including, however, aryl substituted compounds such as styrene, in the presence of cupric chloride dihydrate to add on the unsaturated compound where the alkenyl is, for example, —CH=$CHR^3$ where $R^3$ has the above described meaning.

The following examples serve to illustrate the invention.

Example I

F.E.S. 2,4-dimethylether is nitrated upon addition to mixed acid, 50/50 mixture of concentrated $H_2SO_4$ and $HNO_3$, with ice cooling (temperature of about 0 to 5° C.). F.E.S. 3,5-dinitro-2,4-dimethylether and F.E.S. 5-nitro-2,4-dimethylether are recovered by extraction. The hydroxyl groups of F.E.S. 3,5-dinitro-2,4-dimethylether and F.E.S. 5-nitro-2,4-dimethylether are regenerated by refluxing in acetic acid solution with hydrobromic acid.

Example II

The 2,4-dimethylether of F.E.S. sulfonate is nitrated upon addition to $HNO_3$ with cooling in an ice bath according to Example I to produce the 3,5-dinitro- and 5-nitro-substituted 2,4-dimethylethers of F.E.S.

Example III

The 3,5-dinitro-2,4-dimethylether of dihydro F.E.S. 3,5-dinitro-2,4-dibenzylether of F.E.S. and 3,5-dinitro-2,4-dipropylether of deoxy tetrahydro F.E.S. are produced by nitration according to Example I of, respectively, F.E.S. 2,4-dimethylether, F.E.S. 2,4-dibenzylether and deoxy tetrahydro F.E.S. 2,4-dipropylether.

Example IIIA

The trimethyl substituted tetrahydro F.E.S. having the formula:

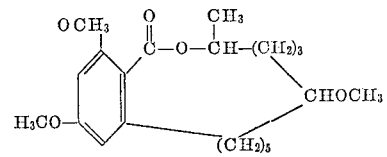

is nitrated according to the process of Example I to produce the corresponding 3,5-dinitro F.E.S. compound.

Example IV

The 3,5-dinitro-2,4-dimethylether of F.E.S. and 5-nitro-2,4-dimethylether of F.E.S. are each reduced by heating on a steam bath with iron powder in a 50% methanolic solution containing HCl (0.25 equiv.) to produce respectively the 3,5-diamino-2,4-dimethylether of F.E.S. and 5-amino-2,4-dimethylether of F.E.S.

Example V

The 3,5-dinitro-2,4-dimethylether of dihydro F.E.S. is reduced upon addition to a solution of stannous chloride in concentrated hydrochloric acid to produce the hydrochloride of 3,5-diamino-2,4-dimethylether of dihydro F.E.S. which is demethylated by heating at 120° C. in benzene with two equivalents of aluminum chloride.

Example VI

The 3,5-diazonium chloride of the 3,5-diamino-2,4-dimethylether of F.E.S. is produced upon addition of 3,5- diamino-2,4-dimethylether of F.E.S. to water containing at least six equivalents of hydrochloric acid, cooling the solution with ice and, with control of the temperature to 0–5° C., slowly adding an aqueous solution of sodium nitrite until, after allowing a few minutes for reaction, the solution gives a positive test for excess nitrous acid with starch-iodide paper.

The 3,5-diamino-2,4-diethylether of dihydro F.E.S. 3,5-diamino-2,4-dibenzylether of F.E.S., and 3,5-diamino-2,4-diethylether deoxy F.E.S. are similarly diazotized to produce the corresponding diazonium chlorides.

Example VII

The diazonium sulfate of the 5-amino-2,4-dimethylether of dihydro F.E.S. is produced by diazotization according to the process of Example VI of 5-amino-2,4-dimethylether of F.E.S. using three equivalents of sulfuric acid.

Example VIII

The 3,5-dicyano-2,4-dimethylether of F.E.S. is produced upon heating the diazonium chloride produced according to Example VI in a solution of cuprous cyanide in excess potassium cyanide at a temperature of about 50° C. The 5-cyano-2,4-dimethylether of dihydro F.E.S. is similarly produced from the diazonium sulfate of Example VII.

Example IX

An aqueous solution of the 3,5-diazonium chloride-2,4-dimethylether of F.E.S. is strongly acidified with sulfuric acid and heated to the boiling point, whereupon nitrogen is evolved and the amine derivatives are converted to hydroxyl groups to produce 3,5-dihydroxy F.E.S. 2,4-dimethylether. The diazonium sulfate of Example VII is converted by this process to the 5-hydroxy-2,4-dimethylether of dihydro F.E.S.

Example X

The 3,5-diazonium chloride-2,4-dimethylether of F.E.S. is added to a large excess of benzene, and sodium hydroxide is slowly dropped into the mixture to produce the 3,5-diphenyl-2,4-dimethylether of F.E.S. The reaction is complete after evolution of nitrogen ceases. The temperature is maintained at about 0° C. by an ice bath. The diazonium sulfate of Example VII is similarly reacted with benzene to produce 5-phenyl-2,4-dimethylether of dihydro F.E.S.

Example XI

The corresponding 3,5-aryl-substituted-2,4-dimethylether of F.E.S. and 5-aryl-substituted-2,4-dimethylethers of F.E.S. are produced substituting for benzene in Example X the following: anisole, benzoic acid, toluene and chlorobenzene.

Example XII

An aqueous solution of the 3,5-diazonium chloride-2,4-dimethylether of F.E.S. is adjusted to pH of 3 to 4 by addition of sodium acetate, the solution is mixed with an equivalent of an aqueous solution of acrylic acid in water and about 0.1 mole of cupric chloride dihydrate to liberate nitrogen, to produce the corresponding 3,5-diacrylate-2,4-dimethylether of F.E.S. having the formula:

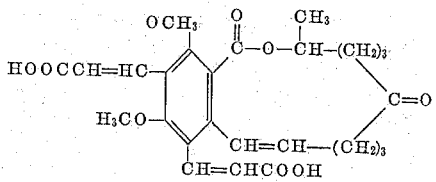

Example XIII

The procedure of Example XII is followed, substituting styrene and propylene, respectively, for acrylic acid to produce the compounds:

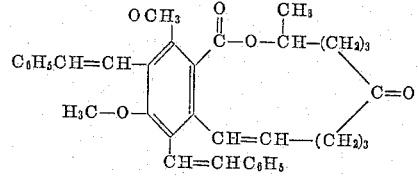

and

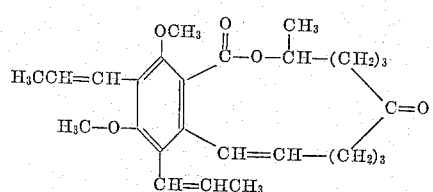

The procedure of Example XII is followed, substituting the diazonium sulfate of Example VII to produce the following compound:

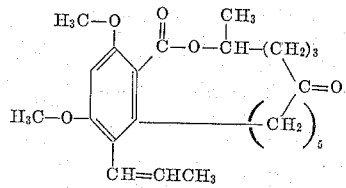

Example XIV 2,4-diacetyl F.E.S. when heated at 165° C. in nitrobenzene in the presence of AlCl₃ is converted into the compound:

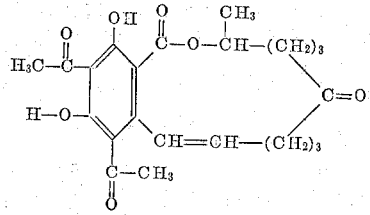

2-acetyl-4-methylether F.E.S. when similarly heated at about 25° C., is converted into the compound:

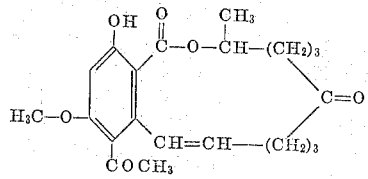

2-acetyl-4-methylether F.E.S. when similarly heated at about 165° C., is converted into the compound:

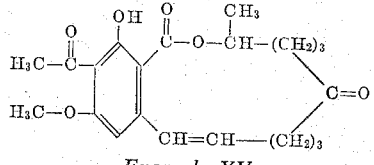

Example XV

The procedure of Example XIV is carried out substituting 2,4-diacetyl dihydro F.E.S., 2,4-dipropionyl deoxy F.E.S. and 2,4-divaleryl F.E.S. for the 2,4-diacetyl F.E.S. to produce the corresponding acyl derivatives.

Example XVI

The 2,4-dimethyl ether of 3,5-dimethoxy F.E.S. is produced upon addition of an excess dimethyl sulfate to an aqueous solution containing 0.3 gram of 3,5-dihydroxy F.E.S. and 2 grams sodium hydroxide. The 2,4-diethyl ether of 3,5-diethoxy F.E.S. is similarly produced by substitution of diethyl sulfate for dimethyl sulfate.

Example XVII

F.E.S. 2,4-dimethylether is alkylated to produce 3,5-dimethyl F.E.S. 2,4-dimethylether upon Friedel-Crafts alkylation with an excess of methyl bromide at about 0 to 5° C. in the presence of aluminum chloride catalyst.

Example XVIII

The 3,5-diethyl, 3,5-dibutyl and 3,5-dihexyl derivatives of F.E.S. 2,4-dimethylether and of dihydro F.E.S. 2,4-dimethylether are produced according to the process of Example XVII substituting ethyl chloride, n-butyl chloride and n-hexyl bromide for methyl bromide.

Example XIX

Six head of cattle are fed a daily ration of alfalfa hay and ground corn cobs containing from 5 to 20 ounces of the compound of Example IV per 100 pounds of feed and their rate of growth is improved.

Example XX

Six head of cattle are fed a daily ration of alfalfa hay and ground corn cobs containing from 5 to 20 ounces of the compound of Example IX per 100 pounds of feed and their rate of growth is improved.

Example XXI

Six head of cattle are fed a daily ration of alfalfa hay and ground corn cobs containing from 5 to 20 ounces of the compound of Example X per 100 pounds of feed and their rate of growth is improved.

Example XXII

Six head of cattle are fed a daily ration of alfalfa hay and ground corn cobs containing from 5 to 20 ounces of the compound of Example XI per 100 pounds of feed and their rate of growth is improved.

Example XXIII

Six head of cattle are fed a daily ration of alfalfa hay and ground corn cobs containing from 5 to 20 ounces of the compound of Example XII per 100 pounds of feed and their rate of growth is improved.

Example XXIV

Six head of cattle are fed a daily ration of alfalfa hay and ground corn cobs containing from 5 to 20 ounces of the compound of Example XIV per 100 pounds of feed and their rate of growth is improved.

Example XXV

Six head of cattle are fed a daily ration of alfalfa hay and ground corn cobs containing from 5 to 20 ounces of the compound of Example XVI per 100 pounds of feed and their rate of growth is improved.

Example XXVI

Six head of cattle are fed a daily ration of alfalfa hay and ground corn cobs containing from 5 to 20 ounces of the compound of Example XVIII per 100 pounds of feed and their rate of growth is improved.

Example XXVII

To 100 ml. of cold concentrated nitric acid in a beaker in an ice bath is added slowly 10.0 g. of F.E.S. 2,4-dimethyl ether. This mixture is stirred for 2 hours during which time the solid goes into solution. The reaction mixture is poured over cracked ice, then filtered. The crude product is recrystallized from 100 ml. of methanol to give 3.7 g. of light yellow crystals, M.P. 163–164° C., of 5-nitro-2,4-dimethylether of F.E.S.

Example XXVIII

To 100 ml. of cold concentrated nitric acid in an ice bath is added slowly 10.0 g. of F.E.S. The mixture is stirred 3 hours, then poured over cracked ice. The crude product is recrystallized from 15 ml. of nitromethane and then from 25 ml. of nitromethane to give 1.6 grams of yellow crystals, M.P. 206–208° C. For each crystallization 0.5 g. of Nuchar C–1000 was used. The product is 5-nitro F.E.S.

Example XXIX

To 5.00 grams of high melting, tetrahydro F.E.S. in 150 ml. of acetic acid is added slowly 10.0 ml. of cold concentrated nitric acid. The mixture is stirred for one hour, poured into 1000 ml. water placed in a refrigerator four days, and then filtered to yield 4.7 grams of solid. Recrystallization from a mixture of 40 ml. isopropanol and 50 ml. of water gives 2.5 grams of product, M.P. 157–180° C. Further recrystallization from a mixture of 25 ml. isopropanol and 25 ml. of water gives 1.32 grams of bright yellow product which melts at 179–182° C. after vacuum drying. Analysis for nitrogen is 6.53%, calculated 6.79%. NMR analysis indicates no aromatic hydrogen atoms and infrared analysis indicates $NO_2$ groups present. The product is 3,5-dinitrotetrahydro F.E.S.

Dihydro F.E.S. and deoxytetrahydro F.E.S. are similarly nitrated to give the corresponding 3,5-dinitro derivatives.

The nitration derivative of deoxytetrahydro F.E.S. is a yellow product melting at 147–149° C. and analyzing 7.82% and 6.92% nitrogen, calculated 7.10%.

The nitration derivative of dihydro F.E.S. is a yellow product, M.P. 134–136° C., increased to 161–167° C. by drying. Analysis of the dried product is 6.88% nitrogen, calculated 6.83%.

Example XXX

To 50 ml. of concentrated sulfuric acid (95%) in an ice bath is added 1.50 grams of F.E.S. then 0.50 gram of potassium nitrate. After stirring for 1 hour, the solids are all dissolved and the solution is poured into 500 ml. of water and placed in a refrigerator at about 40° F. for 18 hours. The reaction mixture is then filtered to give 1.22 grams of product melting at 185–190° C. Recrystallization from 5 ml. of nitromethane gives 0.69 gram of light yellow product melting at 205–206° C. The product is 5-nitro F.E.S.

Example XXXI

Two grams of 5-nitro F.E.S. in 150 ml. of ethanol are catalytically reduced at room temperature in the presence of 0.5 gram of a commercially available 5% palladium on char catalyst at a hydrogen pressure of 50 p.s.i. for three hours. The reduction mixture is filtered, concentrated to 20 ml. on a steam bath at 50 mm. Hg total pressure, cooled for two hours and refiltered to give 0.66 gram of product melting at 182–185° C. Recrystallization from 10 ml. of ethanol gives 0.42 g. of product melting at 185–190° C. analyzing 3.97% nitrogen, calculated 4.18%. Infrared analysis is consistent with a reduced nitro group. The product is 5-aminodihydro F.E.S.

Example XXXII

Two grams of 5-nitro-2,4-dimethyl ether of F.E.S. in 150 ml. of ethanol are catalytically reduced and recovered as in Example XXXI to yield 1.31 grams of product melting at 132–152° C. Recrystallization from 10 ml. of ethanol gives 0.87 gram of product melting at 140–144° C. Further recrystallization from 10 ml. of ethanol gives 0.75 gram melting at 139–144° C. analyzing 3.78% nitrogen, calculated 3.85%. Infrared analysis is consistent with a reduced nitro group. The product is 5-amino-2,4-dimethyl ether of dihydro F.E.S.

Example XXXIII

Two grams of 5-nitro F.E.S. in 150 ml. of ethanol are catalytically reduced at room temperature admixed with 10 grams of a suspension of Raney nickel in water (7 grams nickel) at a hydrogen pressure of 50 p.s.i. for 5 hours. The reaction mixture is filtered, acidified with hydrochloric acid to a pH of 2, concentrated to 80 ml. on a steam bath at 50 mm. Hg total pressure, refrigerated overnight, and filtered to give 1.2 grams of product melting at 258–265° C., analyzing 3.51% nitrogen (3.75% calculated) and 9.45% chlorine (9.49% calculated). This product is dissolved in water, neutralized with sodium hydroxide, extracted with diethyl ether and the ether evaporated to give 5-aminotetrahydro F.E.S.

Example XXXIV

Two grams of 3,5-dinitrodeoxytetrahydro F.E.S. in 150 ml. ethanol are catalytically reduced at room temperature in the presence of 0.2 gram of a commercially available 5% palladium or char catalyst at a hydrogen pressure of 50 p.s.i. for two hours. The reduction mixture is filtered, acidified with concentrated HCl (36%), concentrated to 30 ml. on a steam bath at 50 mm. Hg total pressure, and refrigerated for 19 days. No crystals are present. To the reaction mixture are added 40 ml. of diethyl ether and 200 ml. of petroleum ether. Crystals appear and the mixture is filtered to give 1.72 grams of product melting at 202–208° C. analyzing 6.66% nitrogen, calculated 6.85% for the dihydrochloride salt. This product is dissolved in water, neutralized with sodium hydroxide, extracted with diethyl ether and the ether evaporated to give 3,5-diaminodeoxytetrahydro F.E.S.

Example XXXV

Two grams of 5-nitro F.E.S. in 150 ml. of ethanol are catalytically reduced at room temperature admixed with 10 grams of a suspension of Raney nickel in water (7 grams nickel) at a hydrogen pressure of 50 p.s.i. for 3 hours. To the reaction mixture is added 1.5 ml. of formaldehyde and the catalytic reduction is continued for an additional 3 hours. The reaction mixture is filtered and the filtrate is evaporated to dryness. The residue is taken up in 30 ml. of hot ethanol, concentrated by evaporation in air to about 20 ml., cooled, and filtered to give 0.41 gram of product melting at 158–160° C.

The above reduction procedure is repeated using 3 grams of 5-nitro F.E.S. and 2.3 ml. of formaldehyde. The residue is again taken up in 30 ml. hot ethanol, concentrated by evaporation in air to about 20 ml., cooled, and filtered to give 1.28 grams of product melting at 159°–160° C., analyzing 3.70% nitrogen, calculated 3.83%. Infrared analysis shows absence of the nitro group confirms the product as being 5-dimethylaminotetrahydro F.E.S.

Example XXXVI

To 200 ml. of concentrated nitric acid in a beaker in a water bath are slowly added 20.0 grams of F.E.S. The reaction mixture is stirred for two hours and mixed with 200 ml. of cold water. The reaction mixture is allowed to stand for 2 hours, filtered, the filtrate is set aside and the solid product is washed by stirring with two 800 ml. portions of water. The solid product is recrystallized from a mixture of 500 ml. of hot isopropanol and 3.0 grams of char, the char being filtered from the hot solution, to give 3.6 grams of solid product, recrystallized again from a mixture of 200 ml. isopropanol and 1.0 gram of char, then recrystallized twice more from 150 ml. isopropanol each time to give 1.20 grams of a tannish yellow product melting at 143–146° C. This product is again recrystallized from 130 ml. isopropanol to give 1.1 grams of product melting at 145–149° C. A portion of the product is dried at 100° C. for 4 hours, melting point 147°–150° C. The product is 3-nitro F.E.S.

The filtrate set aside after the first filtration following the nitration reaction is concentrated to dryness, taken up in 60 ml. of hot nitromethane plus 1.0 gram of char, filtered to remove the char, concentrated by evaporation in air to 50 ml., refrigerated overnight, and filtered to give 3.7 grams of product melting at 197–202° C. This product is recrystallized from 30 ml. nitromethane to give 2.4 grams of product melting at 205–206° C. The product is 5-nitro F.E.S.

The following are specific examples of animal feed compositions of this invention useful for increasing the rate of growth and feed efficiency of young animals to market weight.

Example XXXVII

For young beef cattle, i.e., calves to yearlings running to two year olds, each animal is given 5 to 20 milligrams per day of the compound produced in Example XXVIII intimately admixed in about 18 to 22 pounds per head per day of a complete pelleted ration for about 180 days. The complete pelleted ration includes in addition to the compound of Example XXVIII the following:

| | | |
|---|---|---|
| Barley | percent | 40–43 |
| Molasses dried beet pulp | do | 34.5–37.5 |
| Alfalfa pellets | do | 8.0 |
| Tallow | do | 2.5 |
| Calcium carbonate | do | .30 |
| Urea | do | .30 |
| Phosphorus source | do | .40 |
| Salt | do | .50 |
| Molasses | do | 10.00 |
| Trace mineral | do | 0.5 |
| Vitamin A | I.U./ton | 2–4MM |

Note: Milo or corn, for example, can be substituted for the barley.

The compound of Example XXVIII is admixed with the above ingredients in a stationary blender or a feed mix truck in the following amounts in grams per ton to provide an appropriate complete pelleted feed with dosage levels ranging from 5 to 90 milligrams per head per day.

| Grams/ton: | Mg./head/day |
|---|---|
| .5 | 5 |
| 1.0 | 10 |
| 2.0 | 20 |
| 4.0 | 40 |
| 8.0 | 80 |

These gram amounts are premixed with, for example, 10 pounds of soybean hulls prior to admixture with the other ingredients.

Example XXXVIII

For young swine, i.e., six week old pigs to about 100 pound pigs, each animal is given 5 to 20 milligrams per day of the compound of Example XXXI intimately admixed in about 1½ to 5½ pounds per head per day of a grower ration until it reaches a weight of about 100 pounds. When the swine weight between 90 and 125 pounds the feed is changed to one whereby each animal is given 20 to 50 milligrams per day of the compound of Example XXXI intimately admixed in about 5½ to 10 pounds per head per day of a finisher ration until it reaches market weight of about 220 pounds. The grower and finisher ration include in addition to the compound of Example XXXI the following:

| | Grower, percent | Finisher, percent |
|---|---|---|
| Ground Yellow Corn | 77 | 86.7 |
| Soybean Meal (44% protein) | 16 | 6.5 |
| Meat and Bone Scraps (50% protein) | 2.5 | 2.5 |
| Dehydrate Alfalfa Meal (17%) | 2.5 | 2.5 |
| Steamed Bone Meal | 0.5 | 0.5 |
| Ground Limestone | 0.5 | 0.3 |
| Iodized Salt | 0.5 | 0.5 |
| Vitamin, Antibiotic and Trade Mineral Premix | 0.5 | 0.5 |

The compound of Example XXXI is admixed with the above ingredients in a blender in the following amounts in milligrams per pound to provide an appropriate feed with dosage levels ranging from 6 to 96 milligrams per head per day.

| Mg./pound: | Mg./head/day |
|---|---|
| 2 | 6 |
| 4 | 12 |
| 8 | 24 |
| 16 | 48 |
| 32 | 96 |

*Example XXXIX*

For 4 to 10 month old lambs weighing 50 to 70 pounds, each animal is given 1 to 15 milligrams per day of the compound of Example XXXIII, intimately admixed in about 3 to 6 pounds per head per day of a complete ration for 30 to 90 days. The complete ration includes in addition to the compound of Example XXXIII the following:

| | Lbs. |
|---|---|
| Finely ground corn cobs | 630 |
| Ground corn | 600 |
| Dehydrated alfalfa meal | 300 |
| Dried molasses | 120 |
| Soybean meal (44% protein) | 300 |
| Dicalcium phosphate | 14 |
| Trace mineral salt | 17 |
| Premix vitamin, mineral and antibiotic | 19 |

The compound of Example XXXIII is admixed with the above ingredients in a blender in the following amounts in milligrams per pound to provide an appropriate complete feed with dosage levels ranging from 1 to 15 milligrams per head per day.

| Mg./pound: | Mg./head/day |
|---|---|
| .5 | 2 |
| 1.0 | 4 |
| 1.5 | 6 |
| 2.0 | 8 |
| 2.5 | 10 |
| 3.75 | 15 |

*Example XL*

For broilers, i.e., day old to four week old chicks, a grower feed is prepared for feeding to the chicks for the first four weeks and a finisher feed is prepared for feeding the four week old chicks for the last five weeks until they reach market weight of two and a half to three pounds dressed. For each pound of weight gain, the chicks eat about 1.5 to 2 pounds of feed. Thus they eat about 1.5 pounds of feed during the first four weeks and above five pounds of feed during the next five weeks. During the course of this feeding schedule, each bird should receive a total of about 12 to 36 milligrams of the compound of Example XXXV in the grower and finisher feed each of which includes in addition to the compound of Example XXXV the following:

| | Grower (lbs.) | Finisher (lbs.) |
|---|---|---|
| Ground Yellow Corn | 1,000 | 1,200 |
| Soybean Meal (44% Protein) | 700 | 500 |
| Fish Meal (60% Protein) | 100 | 80 |
| Alfalfa Meal | 50 | 50 |
| Meat and Bone Scraps | 0 | 30 |
| Animal Fat | 80 | 80 |
| Dicalcium Phosphate | 35 | 40 |
| Iodized Salt | 10 | 10 |
| Limestone | 15 | |
| Premix Vitamins Trade Minerals and Antibiotics | 10 | 10 |

*Examples XLI to XLVII*

Essentially the same procedure used in Example XIV is followed using compounds of the general formula

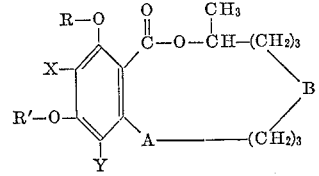

as starting compounds wherein the values for A, B, R, R', X and Y are set forth in Table I below for the respective examples. The products produced from these starting compounds also correspond in structure to the general formula and the values for A, B, R, R', X and Y of the products are set forth in Table II. As noted above, the starting compounds can be prepared using conventional acylation procedures.

TABLE I.—STARTING COMPOUNDS

| Example | A | B | R | R' | X | Y |
|---|---|---|---|---|---|---|
| XLI | —CH=CH— | >C=O | stearoyl | stearoyl | H | H |
| XLII | —CH=CH— | >CH₂ | isobutyroyl | CH₃ | H | H |
| XLIII | —CH₂CH₂— | >CH₂ | oleyl | CH₃ | H | H |
| XLIV | —CH₂CH₂— | >CHOCH₃ | gluconoyl | gluconoyl | H | H |
| XLV | —CH₂CH₂— | >CHOH | adipoyl | CH₃ | H | H |
| XLVI | —CH=CH— | >C=O | levulinoyl | CH₃ | H | H |
| XLVII | —CH₂CH₂— | >CH₂ | thiodiglycolyl | CH₃ | H | H |

TABLE II.—PRODUCT PRODUCED

| Example | A | B | R | R' | X | Y |
|---|---|---|---|---|---|---|
| XLI | —CH=CH— | >C=O | H | H | stearoyl | stearoyl |
| XLII | —CH=CH— | >CH₂ | H | CH₃ | H | isobutyroyl |
| XLIII | —CH₂CH₂— | >CH₂ | H | CH₃ | oleyl | H |
| XLIV | —CH₂CH₂— | >CHOCH₃ | H | H | gluconoyl | gluconoyl |
| XLV | —CH₂CH₂— | >CHOH | H | CH₃ | H | adipoyl |
| XLVI | —CH=CH— | >C=O | H | CH₃ | H | levulinoyl |
| XLVII | —CH₂CH₂— | >CH₂ | H | CH₃ | H | thiodiglycoloy |

It is claimed:
1.

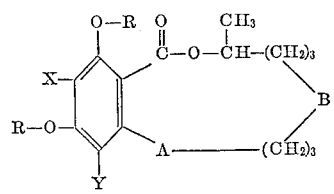

wherein A is a radical selected from the group consisting of —CH=CH— and —CH₂—CH₂—; B is a radical selected from the group consisting of >C=O, >CHOR and >CH₂ with the proviso that A is —CH₂—CH₂— when B is >CH₂; R is selected from the group consisting of hydrogen, lower alkyl radicals, acyclic acyl radicals containing from about 1 to 25 carbon atoms and monocyclic aryl radicals containing up to about 10 carbon atoms; and X and Y are selected from the group consisting of hydrogen, nitro, amino, di-lower alkyl amino, diazonium radical, cyano, hydroxyl, monocyclic aryl radicals containing up to about 10 carbon atoms, alkenyl radicals containing from about 2 to 25 carbon atoms, alkyl radicals containing from about 1 to 15 carbon atoms, alkoxy radicals containing from about 1 to 15 carbon atoms, and acyclic acyl radicals containing from about 1 to 25 carbon atoms; with the proviso that not more than one of X and Y is hydrogen.

2. The compound of claim 1 wherein at least one of X and Y is nitro.

3. The compound of claim 1 wherein at least one of X and Y is amino.

4. The compound of claim 1 wherein R is lower alkyl.

5. The compound of claim 1 wherein at least one of X and Y is lower acyl.

6. The compound of claim 1 wherein at least one of X and Y is alkenyl, said alkenyl being selected from the group consisting of $-CH=CHR^3$, $-CHR^4CH=CH_2$ and $-CH_2CH=CHR^4$ where $R^3$ is selected from the group consisting of alkyl of about 1 to 15 carbon atoms, monocyclic aryl, carboxy and $-R^5COOH$, and $R^4$ and $R^5$ are alkyl of about 1 to 15 carbon atoms.

7. The compound of claim 1 wherein at least one of X and Y is lower alkyl.

8. The compound of claim 1 wherein at least one of X and Y is alkoxy of the formula $-OR^6$ where $R^6$ is alkyl of about 1 to 15 carbon atoms.

9. The compound of claim 1 wherein at least one of X and Y is monocyclic aryl, said monocyclic aryl being selected from the group consisting of phenyl, chlorophenyl, tolyl, methoxyphenyl and benzoyl.

10. An animal feed comprising a nutrient ration and a growth promoting amount of the compound of claim 1.

No references cited.

A. LOUIS MONACELL, *Primary Examiner.*

H. H. KLARE, *Assistant Examiner.*